(No Model.) 2 Sheets—Sheet 2.
J. B. WATSON.
HOT WATER HEATER.
No. 448,391. Patented Mar. 17, 1891.
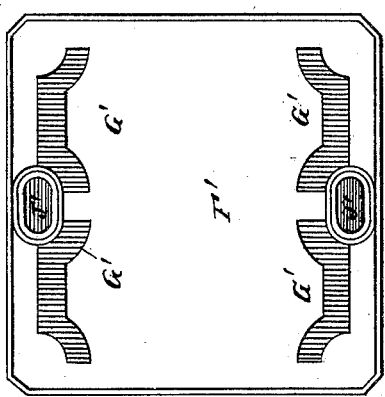
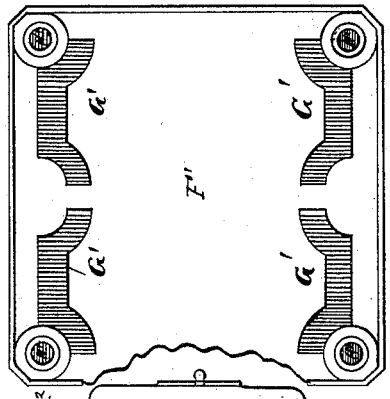
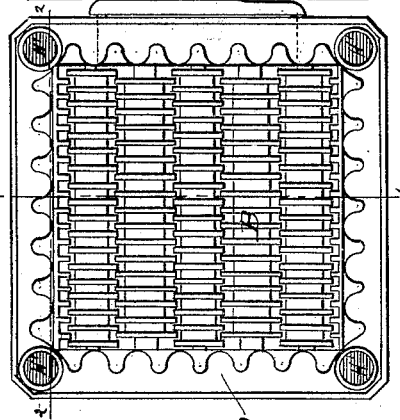
WITNESSES:
Th. Franke
W. Einhern
INVENTOR
James B. Watson
BY
ATTORNEYS

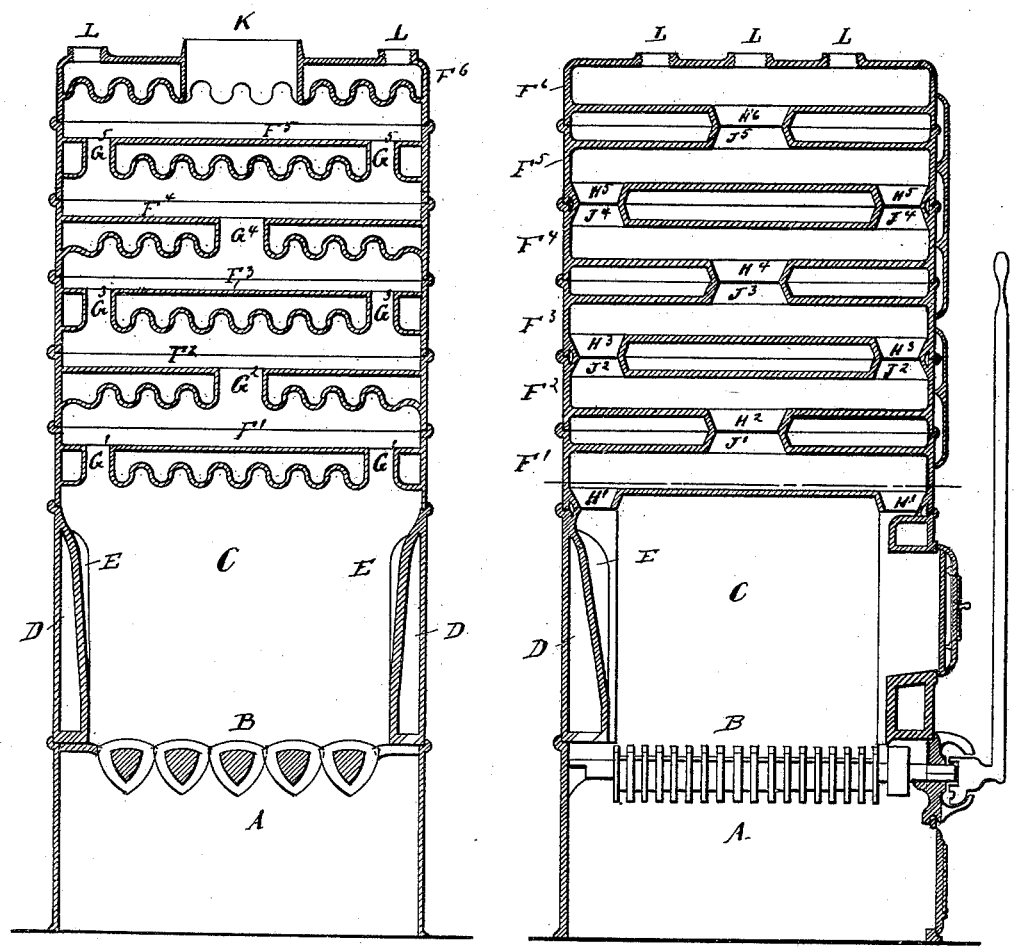

UNITED STATES PATENT OFFICE.

JAMES B. WATSON, OF NEW BRUNSWICK, NEW JERSEY.

HOT-WATER HEATER.

SPECIFICATION forming part of Letters Patent No. 448,391, dated March 17, 1891.

Application filed September 15, 1890. Serial No. 365,022. (No model.)

*To all whom it may concern:*

Be it known that I, JAMES B. WATSON, of New Brunswick, county of Middlesex, and State of New Jersey, a citizen of the United States, have invented certain new and useful Improvements in Hot-Water Heaters, of which the following is a specification.

This invention relates to improvements in that class of devices that are used for heating water for the purpose of heating buildings.

The object of my invention is to provide a new and improved water-heater so constructed that the products of combustion come in contact with a very great surface of the heater, and the water is thus heated very rapidly, and, furthermore, that the products of combustion are compelled to pass alternately from the sides toward the center and from the center toward the sides of the heater.

The invention consists in a water-heater composed of a water-leg and a series of superimposed sections having alternate side and central openings for the passage of heat and side and central openings for the passage of the water, the water-compartments being in communication with each other and the water-leg.

The invention also consists in the construction and combination of parts and details, which will be fully described hereinafter, and finally pointed out in the claims.

In the accompanying drawings, Figure 1 is a vertical transverse section of my improved water-heater on the line 1 1, Fig. 3. Fig. 2 is a vertical longitudinal sectional view on the line 2 2, Fig. 3. Fig. 3 is a plan view of the fire-pot and grate. Fig. 4 is a bottom view of the first section, parts being broken out. Fig. 5 is a top view of the first section. Fig. 6 is a bottom view of the second section. Fig. 7 is a top view of the second section, and Fig. 8 is a top view of the uppermost section.

Similar letters of reference indicate corresponding parts.

My improved water-heater is constructed with a base A, in the top of which a suitable grate B is formed, said grate being located in the bottom of a fire-pot C, formed within a water-leg D. The interior of the pot is slightly tapered from the top downward and provided with ribs E, forming corrugations in the inner walls of the water-leg. Upon the water-leg the upper part of the heater rests, which is built up of the sections $F'\ F^2\ F^3\ F^4\ F^5\ F^6$. The under side of each section is provided with corrugations, and the upper side is made flat. The first section $F'$ is provided on the two opposite sides with two groups of heat-openings $G'$, there being two openings $G'$ in each group, as shown in Fig. 4. It is also provided in each corner of its bottom with a water-opening $H'$, said water-openings communicating with the water-leg F, as shown in Fig. 2, and it is further provided in its top with a neck or opening $J'$ on two opposite sides, through which the water can pass into the next section above. The second section $F^2$ is provided with a central heat-opening $G^2$ and in its bottom with a water neck or opening $H^2$ at two opposite sides, which registers with the water opening or neck $J'$ of the first section $F'$, and in its top it is provided at each corner with a water-opening $J^2$. The third section $F^3$ is provided, like the first, with the side openings $G^2$ for the passage of the products of combustion and with the corner openings $H^3$ in the bottom for the water and the side top openings $J^3$ for the passage of the water. The fourth section $F^4$ is constructed like the second and provided with a central heat-opening $G^4$ and with the side bottom water-openings $H^4$ and the corner top water-openings $J^4$. The fourth section is constructed, like the first, with two side heat-openings $G^5$ and with the bottom corner openings $H^5$ for the water and the side top opening $J^5$ for the water. The uppermost section $F^6$ is provided with a central opening or neck K, upon which the smoke-flue is applied, and with the central side openings $H^6$ for the water and a series of top openings L, in which the ends of the water-conducting pipes are arranged. The products of combustion from the fire-pot pass through the side openings of the bottom section $F'$, then over the top of said bottom section, through the central aperture of the second section $F^2$, over the top of said second section, strike the bottom of the third section, pass through the side openings of the third section, over the top of said third section, strike the bottom of the fourth section, pass through the central aperture of said fourth section, and so on until they pass out through the top neck K. The products of combustion are thus compelled to pass alternately from the sides of the heater to the center, thus describing a regular serpentine course through the heater, as indicated by the arrows $x$. Thereby the products of combustion come in contact with an exceedingly great heating-surface, and at the same time are prevented from rushing through the heater without spending their heat. All the parts of the heater are subjected to the effects of the products of combustion in a uniform manner. The products of combustion can readily pass through the heater in the manner indicated by the arrows, and there is no undue friction and a perfect draft. The hot water passes from the water-leg through the several sections in the manner indicated by the arrows $y$ in Fig. 2, thus coming in contact with an exceedingly great amount of heated surface.

It is evident that, if circumstances desire it, the capacity of the heater may be increased by adding more sections than I have shown, as the sections $F'$, $F^3$, and $F^5$ are exactly alike, as are also the sections $F^2$ $F^4$.

The joints of the several sections are to be carefully packed and closed in any well-known simple manner, so as to prevent leakage.

The heater is simple in construction and not apt to get out of order.

Having thus described my invention, I claim as new and desire to secure by Letters Patent—

1. A water-heater constructed of a series of superimposed sections, said sections alternately having heat-passages at the sides and the center and all having water-passages at the sides and corners alternately at the top and bottom, substantially as set forth.

2. A water-heater composed of a series of superimposed sections, said sections alternately having heat-passages at the sides and centers and water-openings at the sides and corners in the tops and bottoms, the under sides of the sections being corrugated and the upper surfaces smooth, substantially as set forth.

3. A water-heater provided with a series of superimposed sections, the sections having alternately two side openings and a single central opening for the passage of the heated gases and side openings, and alternately corner and side openings in the top and bottom for the passage of the water, those sections having the openings for the passage of the heat at the sides being provided in the bottom with corner openings for the water and in the top with side openings for the water, substantially as set forth.

4. In a water-heater, the combination, with a leg having a fire-pot, of a series of superimposed sections, said sections alternately having heat-passages at the sides and center and having water-passages at the sides and corners alternately, the water-compartments being in communication with the water-leg, substantially as set forth.

In testimony that I claim the foregoing as my invention I have signed my name in presence of two subscribing witnesses.

JAMES B. WATSON.

Witnesses:
JOHN S. VOORHEES,
R. E. MARTIN.